United States Patent
Chang et al.

(10) Patent No.: US 10,078,351 B1
(45) Date of Patent: Sep. 18, 2018

(54) ELECTRONIC DEVICE HAVING AUTOMATIC ELEVATING ASSEMBLY

(71) Applicant: Wistron Corporation, New Taipei (TW)

(72) Inventors: Shou-Lun Chang, New Taipei (TW); JingYi Cao, New Taipei (TW); Xu Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/862,650

(22) Filed: Jan. 5, 2018

(30) Foreign Application Priority Data

Oct. 16, 2017 (CN) .......................... 2017 1 0962139

(51) Int. Cl.
*G06F 1/16* (2006.01)
*G06F 1/18* (2006.01)

(52) U.S. Cl.
CPC .......... *G06F 1/1667* (2013.01); *G06F 1/1664* (2013.01); *G06F 1/1679* (2013.01); *G06F 1/182* (2013.01)

(58) Field of Classification Search
CPC ................................................... G06F 1/1667
See application file for complete search history.

(56) References Cited

U.S. PATENT DOCUMENTS

| 6,853,543 | B1* | 2/2005 | Moore | G06F 1/1667 361/679.12 |
| 2004/0012919 | A1* | 1/2004 | Chen | G06F 1/1616 361/679.11 |
| 2010/0165560 | A1* | 7/2010 | Zhu | G06F 1/1616 361/679.12 |
| 2013/0222995 | A1* | 8/2013 | Wang | G06F 1/1613 361/679.12 |
| 2014/0160654 | A1* | 6/2014 | Yoo | G06F 1/1637 361/679.12 |

FOREIGN PATENT DOCUMENTS

| CN | 205427718 U | 8/2016 |
| TW | 354837 | 3/1999 |
| TW | M377625 | 4/2010 |

* cited by examiner

*Primary Examiner* — Anthony Q Edwards
(74) *Attorney, Agent, or Firm* — Winston Hsu

(57) ABSTRACT

In an electronic device, a lift structure, composed by electromagnets, magnetic components, and support piece, is disposed at a rear end of an electronic part and a housing. The magnetic components can be permanent magnets and disposed at the rear end of the electronic part and the support piece. The electromagnets are controlled by driving device to a configuration so as to have repulsion and attraction to the rear end and to the support piece respectively, thereby configuring the rear end to a lifted position, or to another configuration so as to have attraction and repulsion to the rear end and to the support piece respectively, thereby configuring the rear end to a retracted position. An adjusting component is further used to adjust the position of the electromagnet to determine the height of the rear end of the electronic part when set in the lifted position.

15 Claims, 12 Drawing Sheets

ELECTRONIC DEVICE HAVING AUTOMATIC ELEVATING ASSEMBLY

BACKGROUND OF THE INVENTION

1. Field of the Invention

The invention relates to an electronic device, and more particularly, to an electronic device with one side of its electronic part controllable by electromagnetic driving device and configurable to be lifted or retracted to various angles with respect to the housing.

2. Description of the Prior Art

Electronic devices with display or keyboard, such as laptop computers, tablets, or flat panel displays, are products quite commonly used in office, learning environment, and everyday life. To provide better use experience, it is needed from time to time to adjust the angle of some of whose electronic part while using the electronic devices. For example, the flat panel display or the screen of a computer needs to be adjusted to a proper viewing angle, and the keyboard of a laptop computer could only provide better ergonomic experience when the angle between the keyboard and the hands is taken into consideration.

For example, when a user takes keyboard as the input tool, it would be much easier for the user to use the keyboard for a long time without suffering from fatigue or cumulative injury, if the keyboard is ergonomically tilted with a lower front and higher back. A common way of making keyboards adjustable to low front and high back feature is to place a rotatable support at the back of a stand-along keyboard of the desktop computer. It is quite different, however, in designing such feature for laptop computers as for desktop computers. Integrity and portability of components result in lack of adjustability of the angle of keyboard for the laptop computers and henceforth, users have no choice but to use the keyboard of a laptop computer in a not very ergonomic way.

SUMMARY OF THE INVENTION

Hence, the embodiments of the invention provide an electronic device to solve the problem of lacking tilting adjustability for the keyboard of a laptop computer or for an electronic part of an electronic device.

According to an embodiment, the invention provides an electronic device having automatic elevating assembly. The electronic device includes a housing, an electronic part, and an elevating assembly. The housing has an opening, the electronic part is disposed in the opening with a front end of the electronic part pivoting to a first side of the opening. A rear end of the electronic part opposite to the front end is selectively configurable to a lifted position or a retracted position via the elevating assembly. The elevating assembly includes an electromagnetic unit, a first magnetic element, and a support piece. The electromagnetic unit includes a first component and a second component respectively disposed at a second side, which is opposite to the first side, and a third side of the opening. The electromagnetic unit is selectively configurable at a first magnetic configuration or a second magnetic configuration. The first magnetic element is disposed at the rear end of the electronic part and facing the first component of the electromagnetic unit. The support piece includes a first end and a second end. The first end is pivoted to the electronic part and the second end includes a second magnetic element slidably disposed at the third side of the opening and facing the second component of the electromagnetic unit. When the electromagnetic unit is configured at the first magnetic configuration, the first component of the electromagnetic unit and the first magnetic element are having same polarity and are repulsed away with each other, and the second component of the electromagnetic unit and the second magnetic element are having opposite polarities and are attracted to each other such that the rear end of the electronic part is configured to the lifted position. When the electromagnetic unit is configured at the second magnetic configuration, the first component of the electromagnetic unit and the first magnetic element are having opposite polarities and are attracted to each other, and the second component of the electromagnetic unit and the second magnetic element are having same polarity and are repulsed away with each other such that the rear end of the electronic part is configured to the retracted position.

The electronic device provided in the invention uses electromagnetic control and limit structure to perform automatic lifting and retracting of the rear end of the electronic part, with one click control. Lifting of the electronic part during operation is never a problem of taking up extra space but improving user experience instead.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
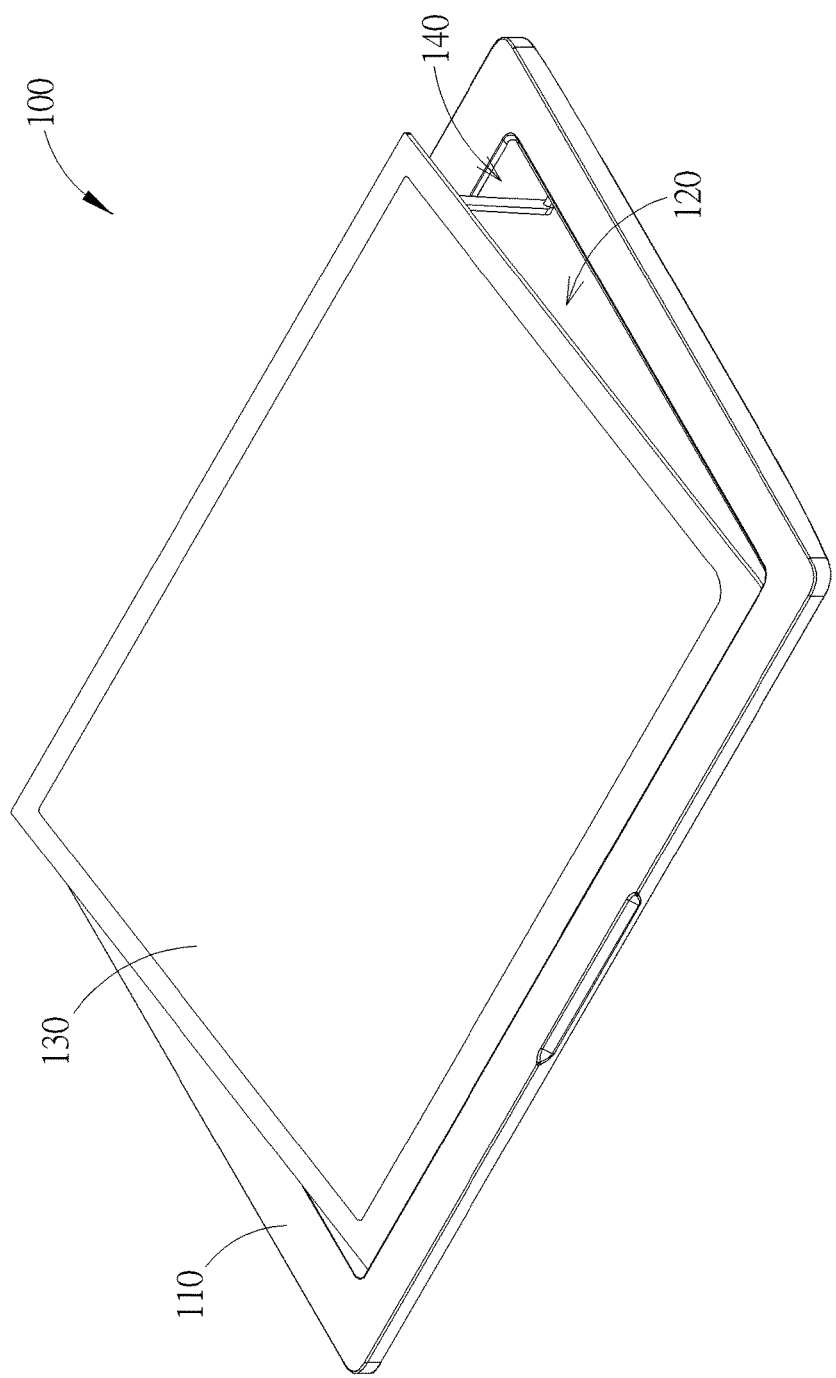
FIG. 1 is an illustration of an electronic device according to an embodiment of the invention.

Please refer to FIG. 1. FIG. 1 is an illustration of an electronic device according to an embodiment of the invention. An electronic device 100 has an electronic part 130 pivoted to an opening 120 of a housing 110 and one side of the electronic part 130 can be adjusted to lift or retract through an elevating assembly 140, or further be lifted to an extent with a certain angle so as to provide great experience to use. In one embodiment of the invention, the electronic device 100 can be a flat panel display whose electronic part 130 is the touch display panel. In other embodiment, the electronic device 100 can be a laptop computer that utilizes the elevating assembly 140 to lift a rear end of the electronic part 130, i.e., the keyboard of the laptop computer. Such keyboard with tilting angle gives out ergonomic experience for a user uses the laptop computer. For describing purpose, a laptop computer with rear end elevating keyboard is herein taken as exemplary embodiment in the application.

Figure 2:
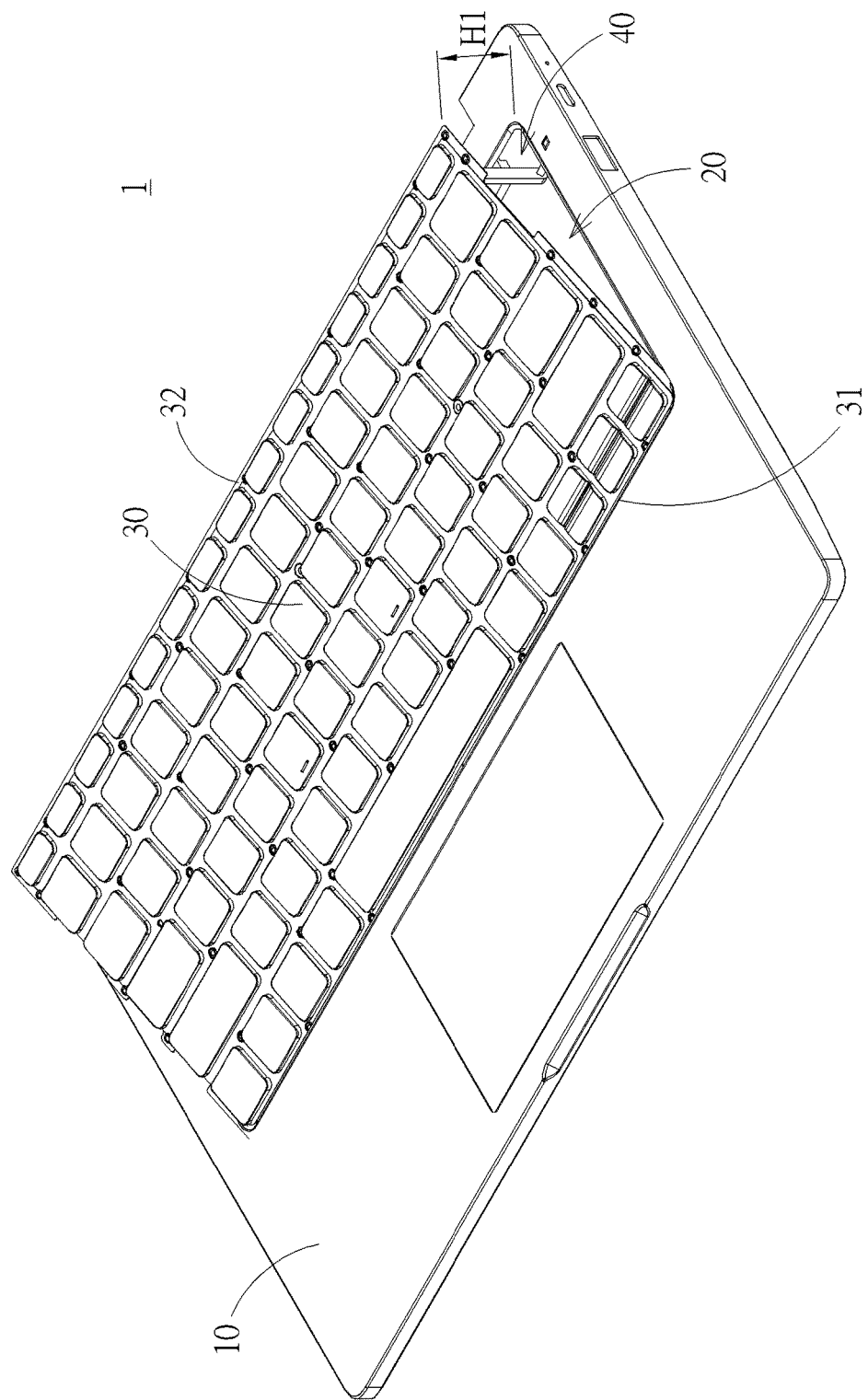
FIG. 2 is an illustration of a laptop computer configured at a first status.
Figure 3:
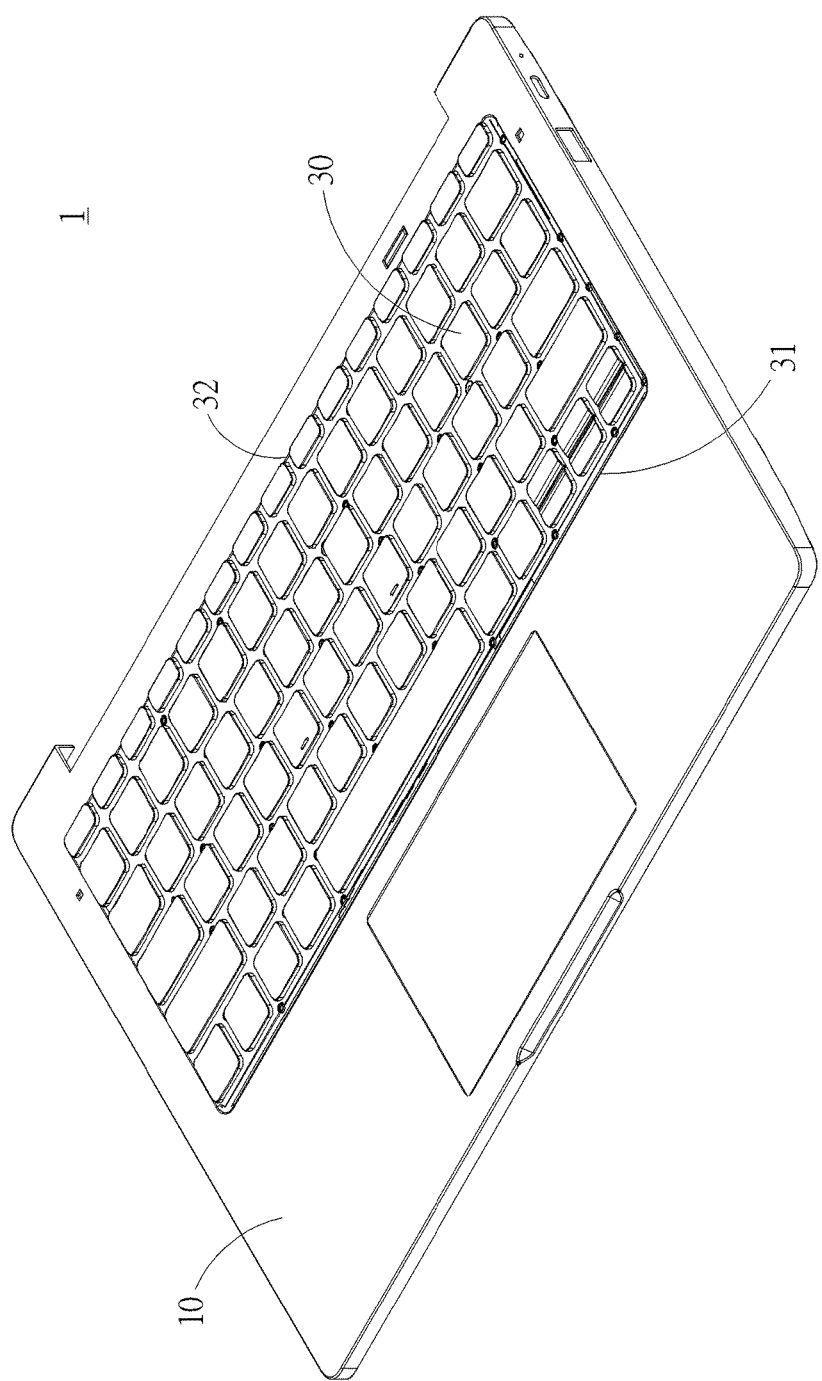
FIG. 3 is an illustration of a laptop computer configured at a second status.

Please refer to FIG. 2 and FIG. 3. FIG. 2 is an illustration of a laptop computer configured at a first status and FIG. 3 is an illustration of a laptop computer configured at a second status. The display and components within the housing of a laptop computer and description about them are omitted hereinafter for brevity purpose. As shown in FIG. 2 and FIG. 3, the electronic device of the invention can be exemplified as a laptop computer 1 having a housing 10, an electronic part 30, and an elevating assembly 40. The housing 10 includes an opening 20, the electronic part 30 can be the keyboard of the laptop computer 1 disposed in the opening 20, and the elevating assembly 40 is utilized to selectively set the electronic part 30 at a lifting position as shown in FIG. 2 or at a retracted position as shown in FIG. 3.

Figure 4:
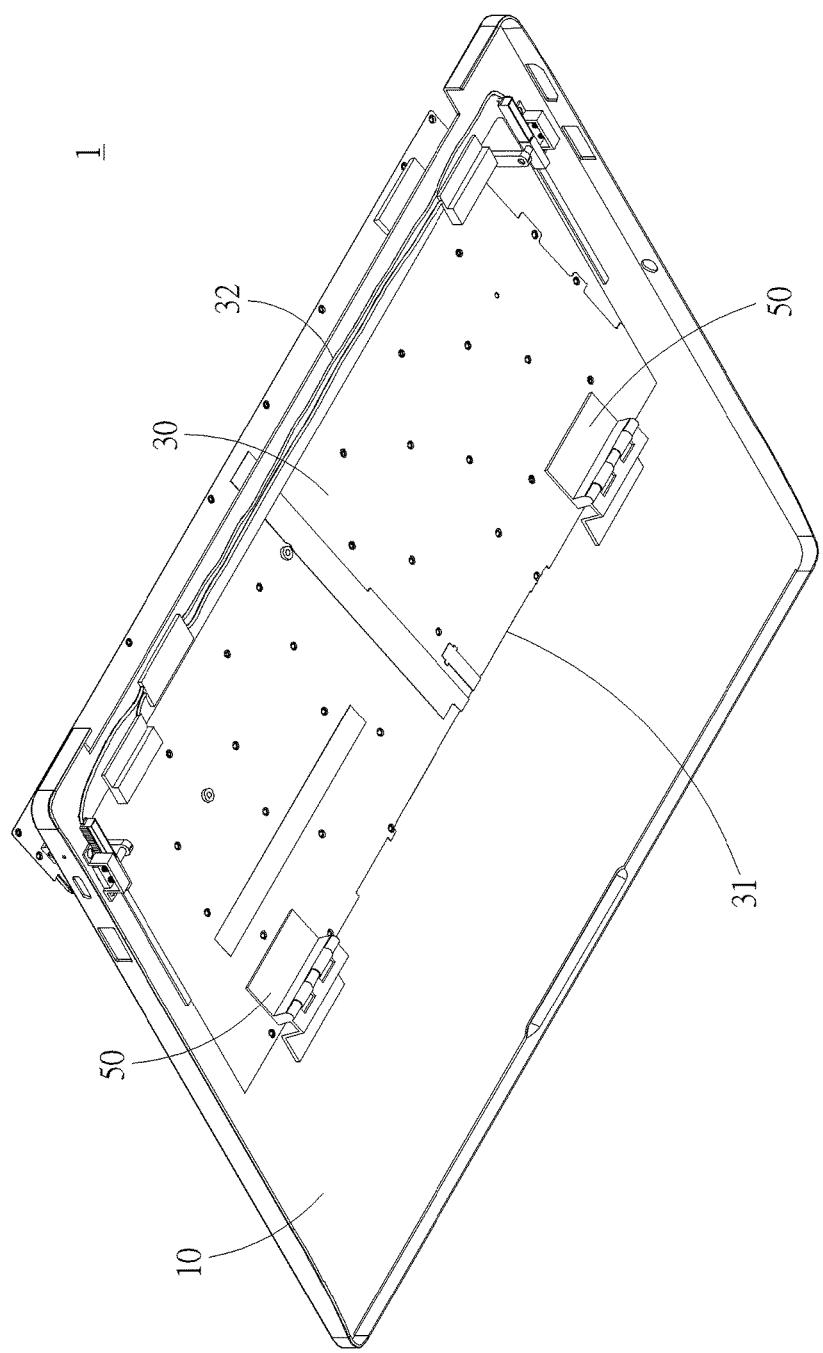
FIG. 4 is an illustration showing another perspective view of the laptop computer in FIG. 2 without inside components.
Figure 5:
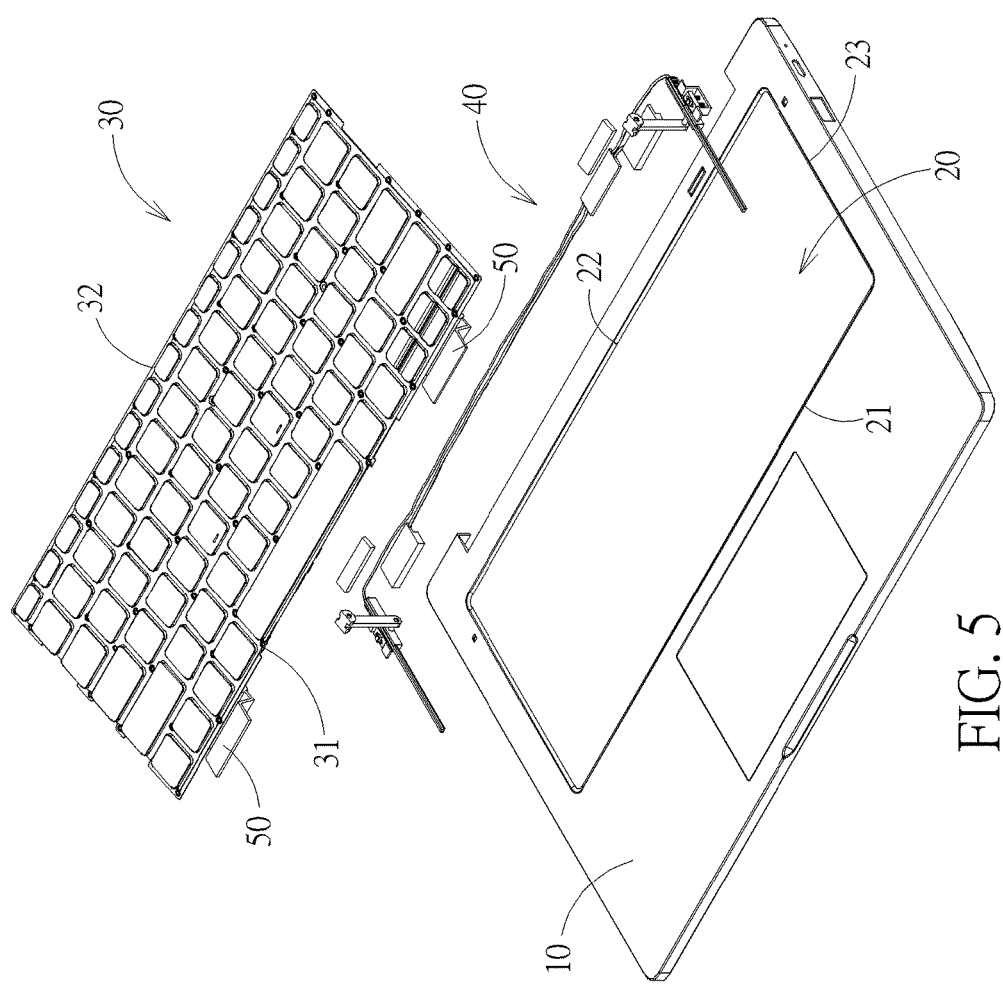
FIG. 5 is an illustration of an exploded view of the purpose related components of an embodiment of the laptop computer in FIG. 2.

Please refer to FIG. 4 and FIG. 5. FIG. 4 is an illustration showing another perspective view of the laptop computer in FIG. 2, without depicting the components within the housing and FIG. 5 is an illustration of an exploded view of the purpose related components of an embodiment of the laptop computer in FIG. 2. The electronic part 30 has a front end 31 and a rear end 32 opposite to each other, whereas the opening 20 of the housing 10 has a first side 21 and a second side 22 opposite to each other. A pivoting element 50 is disposed at the front end 31 of the electronic part 30 and in this embodiment, the pivoting element 50 can be exemplified as two pivoting elements 50 in the form of damping hinge at both the left side and the right side of the front end 31 of the electronic part 30, which is pivoted to the first side 21 of the opening 20 via the pivoting elements 50. The elevating assembly 40 is disposed both at the second side 22 of the opening 20 and at the rear end 32 of the electronic part 30. Adopting principle of attraction and repelling between magnetic components from the elevating assembly 40, the rear 32 of the electronic part 30 will be moved upward or downward with respect to the second side 22 of the housing 10, thereby configuring the electronic part 30 at the lifted position as shown in FIG. 2 or the retracted position as shown in FIG. 3.

Figure 6:
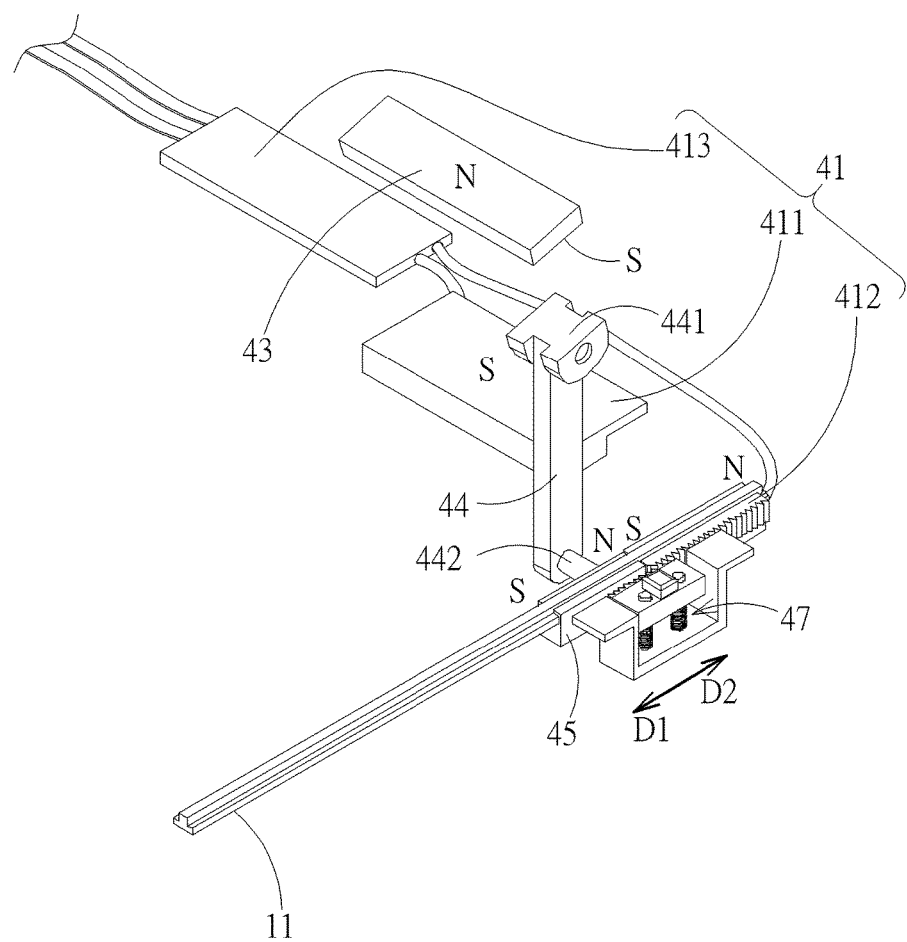
FIG. 6 is an illustration showing configuration and disposition of the components of the elevating assembly when the electronic part is set at the lifting position as shown in FIG. 2.

Please refer to FIG. 6, which is an illustration showing configuration and disposition of the components of the elevating assembly when the electronic part is set at the lifting position as shown in FIG. 2. It should be noted that for a preferred embodiment of the invention, the components of the elevating assembly 40, except for a driving device 413, appear in pair at both sides of the electronic part 30 and the housing 10 for stabilized support and fluent elevation of the rear end 32 of the electronic part 30. Other embodiments may deploy the elevating assembly 40 at just one side or at the middle bottom of the electronic part 30, as the embodiment shown in FIG. 12. Components of the elevating assembly 40 shown at one side are illustrated in the following illustrations for descriptive purpose. The elevating assembly 40 includes an electromagnetic unit 41, a first magnetic element 43, and a support piece 44. The electromagnetic unit 41 is disposed at the second side 22 and a third side 23 (referring to FIG. 5) of the opening 20. For the preferred embodiment shown in FIG. 5 and FIG. 6, the third side 23 respectively connects ends of the first side 21 and the second side 22. In other words, the first side 21, the second side 22, and the two third sides 23 at the left and at the right form the four sides of the opening 20. Additionally, a slide structure in the form of a track or a groove, or exemplified as a T-shape track 11 in the embodiment, is disposed at the third side 23. It should be noted that for any person skilled in the art, the structural components like track and groove are swappable in position and should be regarded as being enclosed by the application.

The first magnetic element 43 can be in the form of permanent magnet disposed at the bottom of the rear end 32 of the electronic part 30 and facing a portion of the electromagnetic unit 41. The electromagnetic unit 41 is a combination of electromagnets driven by electric power, which includes a first electromagnet 411 (a first component), a second electromagnet 412 (a second component), and a driving device 413. The first electromagnet 411 is disposed at the second side 22 of the opening 20 and facing the first magnetic element 43 and the second electromagnet 412 is disposed at the third side 23 of the opening 20. The driving device 413, electrically connected to the first electromagnet 411 and the second electromagnet 412, includes a circuit board and a switch mounted on the circuit board (not shown) and selectively configures the first electromagnet 411 and the second electromagnet 412 at a first magnetic configuration or a second magnetic configuration by using the polarity occurrence when the first electromagnet 411 and the second electromagnet 412 are electrically turned on.

The support piece 44 includes a first end 441 and a second end 442, in which the first end 441 is pivoted to the electronic part 30 and the second end 442 having a second magnetic element 45 in the form of a permanent magnet. The second end 442 and the second magnetic element 45 are slidably disposed on the T-shape track 11 at the third side 23 of the opening 20, thereby slidable along the third side 23 and facing the second electromagnet 412 of the electromagnetic unit 41.

As described, the driving device 413 of the electromagnetic unit 41, provided with the switch at the back of its circuit board and exposed from the housing 10 for operation by a user, controls the electromagnetic unit 41 to be selectively configured at the first magnetic configuration or the second magnetic configuration. As shown in FIG. 6, as in the status of the laptop computer 1 with an opened display (not shown), pressing the driving device 413 to configure the electromagnetic unit 41 at the first magnetic configuration, the first electromagnet 411 of the electromagnetic unit 41 and the first magnetic element 43 are having same polarity and are repulsed away with each other. For the embodiment in FIG. 6, the first magnetic element 43 as a permanent magnet has its S pole facing the first electromagnet 411, which also generates S polarity at the surface facing the first magnetic element 43 when electrically turned on to the first magnetic configuration. Meanwhile, the second electromagnet 412 of the electromagnetic unit 41 and the second magnetic element 45 are having opposite polarities and are attracted to each other. For the embodiment in FIG. 6, the second magnetic element 45 as a permanent magnet has its N pole facing the second electromagnet 412, which also generates S polarity at the surface facing the second magnetic element 45 when electrically turned on to the first magnetic configuration. Such configuration subsequently causes that the rear end 32 of the electronic part 30 is lifted and is configured to the lifted position as shown in FIG. 2.

It should be noted that during the process of the rear end 32 of the electronic part 30 being lifted, the support piece 44 at the sides of the electronic part 30 is also rotated to open up, with its second magnetic element 45 sliding along direction D2 on the T-shape track 11 and finally attached to the second electromagnet 412, ensuring that the support piece 44 swings no more or retracts. The electronic part 30 may be firmly supported by the support piece 44, thereby preventing any unexpected vibration of the electronic part 30 when being operated, either clicking or pressing. Additionally, the pivoting elements 50 in the form of damping hinge are capable of controlling the rear end 32 of the electronic part 30 to bounce up in a slow and steady way under the repulsion and attraction of magnets, all the way to the stop point as the second magnetic element 45 is attached to the second electromagnet 412.

Figure 7:
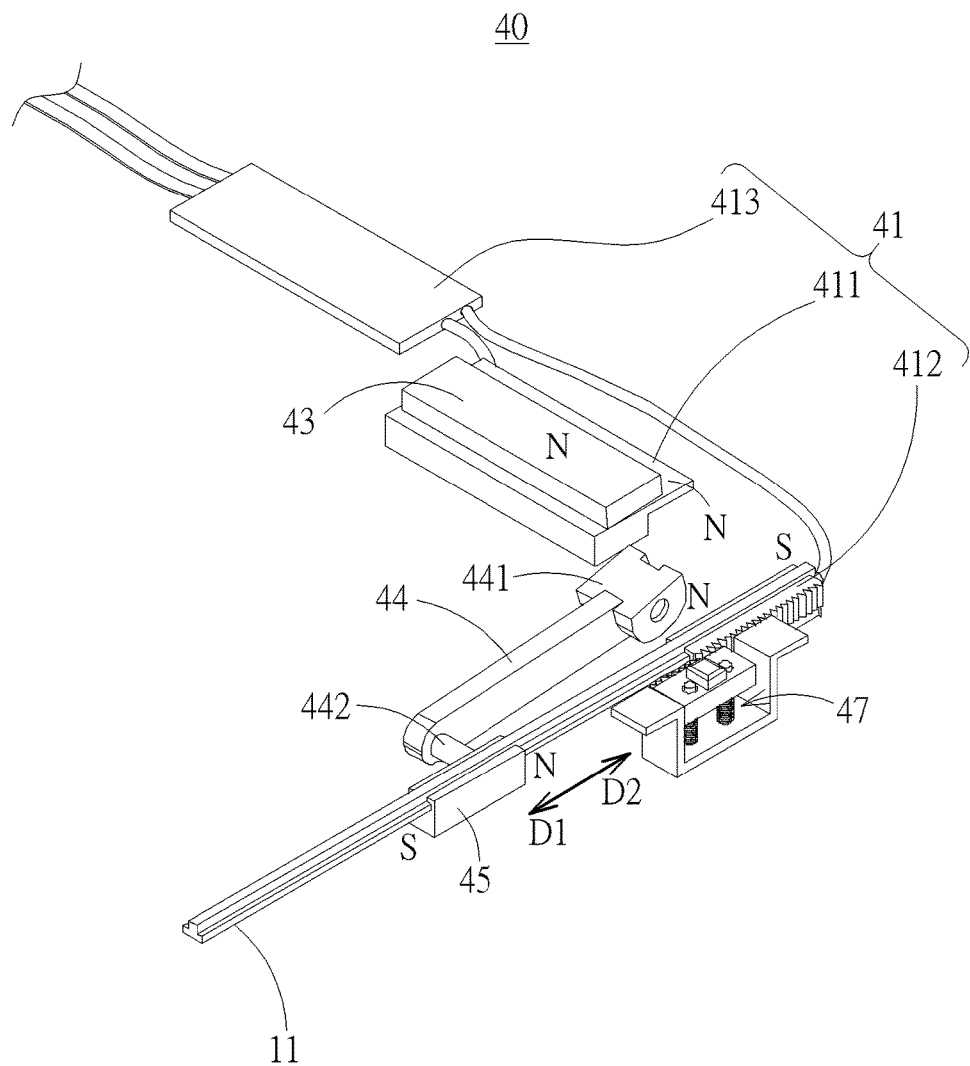
FIG. 7 is an illustration showing configuration and disposition of the components of the elevating assembly when the electronic part is set at the retracted position as shown in FIG. 3.

Please refer to FIG. 7, which is an illustration showing configuration and disposition of the components of the elevating assembly when the electronic part is set at the retracted position as shown in FIG. 3. As shown in FIG. 7, when pressing the driving device 413 to configure the electromagnetic unit 41 at the second magnetic configuration, the first electromagnet 411 of the electromagnetic unit 41 and the first magnetic element 43 are having opposite polarities and are attracted to each other. For the embodiment in FIG. 7, the first electromagnet 411 is electrically turned on to generate N polarity at the surface facing the first magnetic element 43. Meanwhile, the second electromagnet 412 of the electromagnetic unit 41 and the second magnetic element 45 are having same polarity and are repulsed away from each other. For the embodiment in FIG. 7, the second electromagnet 412 is electrically turned on to generate N polarity at the surface facing the second magnetic element 45 to push the second magnetic element 45 toward direction D1. Such configuration subsequently causes that the rear end 32 of the electronic part 30 is pulled down and is configured to the retracted position as shown in FIG. 3, with the support piece 44 'automatically' goes back to its original position. Likewise, the pivoting elements 50 in the form of damping hinge are capable of controlling the rear end 32 of the electronic part 30 to fall down in a slow and steady way under the repulsion and attraction of magnets.

It should be noted that the T-shape track 11 may be alternately mounted at the third side 23 of the housing 10 or be directly incorporated to the third side 23 of the housing 10 in the forming stage of component. The second magnetic element 45 sliding on the T-shape track 11 can be implemented as magnet with T-shape groove or formed by placing magnet inside a box with T-shape groove so as to be mounted to the T-shape track 11.

Figure 8:
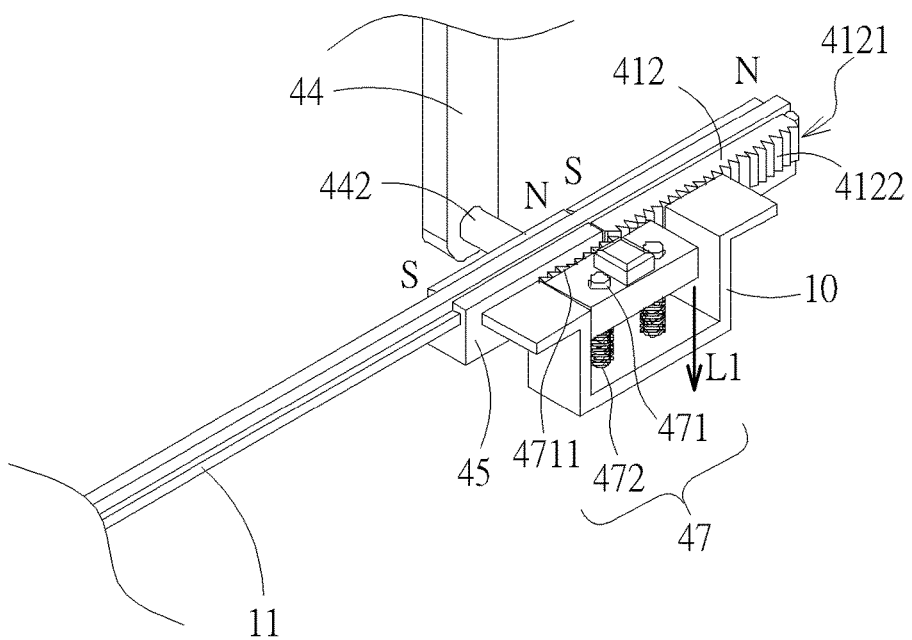
FIG. 8 is an illustration showing relative structure of an adjusting component of the elevating assembly and the second electromagnet.

Please refer to FIG. 8. FIG. 8 is an illustration showing relative structure of an adjusting component of the elevating assembly and the second electromagnet. In addition to selectively position the rear end 32 of the electronic part 30 either at the lifted position or at the retracted position, the elevating assembly 30 of the invention may further adjust the height of the rear end 32 of the electronic part 30 when lifted for adaptive tilted angle of the electronic part 30 as a keyboard to be clicked or a display to be watched. In the use of the adjusting component to displace and position the second electromagnet 412 on the T-shape track 11, the second electromagnet 412 varies its position on the T-shape track 11 and is retained, hence altering the angle between the support piece 44 and the electronic part 30 and determining the height of the rear end 32 of the electronic part 30 to be lifted.

In FIG. 8, the elevating assembly further includes the adjusting component 47 disposed at the third side 23 of the opening 20 and located next to the second electromagnet 412. It should be noted that in this embodiment, the second electromagnet 412 may also be slidably disposed on the T-shape track 11 at the third side 23 just like the second magnetic element 45. The adjusting component 47 selectively adjusts the position, along direction D1D2 as shown in FIG. 7, of the second electromagnet 412 at the third side 23. The adjusting component 47 includes a first limit part 471, a second limit part 4121, and a resilient restoring component 472. The second limit part 4121 is incorporated with the second electromagnet 412 whereas the resilient restoring component 472 in the form of compressed spring is connected to the first limit part 471 and part of the housing 10, or connected between portions of the housing 10, and is exerted upon the first limit part 471. The first limit part 471 has a button exposed from the housing 10 (referring to FIG. 11) for being pressed to sink the first limit part 471 along direction L1 to compress the resilient restoring component 472.

In the embodiment of the invention, the first limit part 471 and the second limit part 4121 respectively include rack structures 4711, 4122 or gear structures engaged with each other. As for the status in FIG. 8, which indicates that the first limit part 471 has yet to be pressed to sink, the rack structure 4711 of the first limit part 471 is coupled with the rack structure 4122 of the second limit part 4121 and the second electromagnet 412 is fixed on the T-shape track 11 at the third side 23. To adjust the position of the second electromagnet, press the first limit part 471 along direction L1 to decouple the rack structure 4711 of the first limit part 471 from the rack structure 4122 of the second limit part 4121, rendering the second electromagnet 412 allowable to slide along the T-shape track 11 and change its position.

Figure 9:
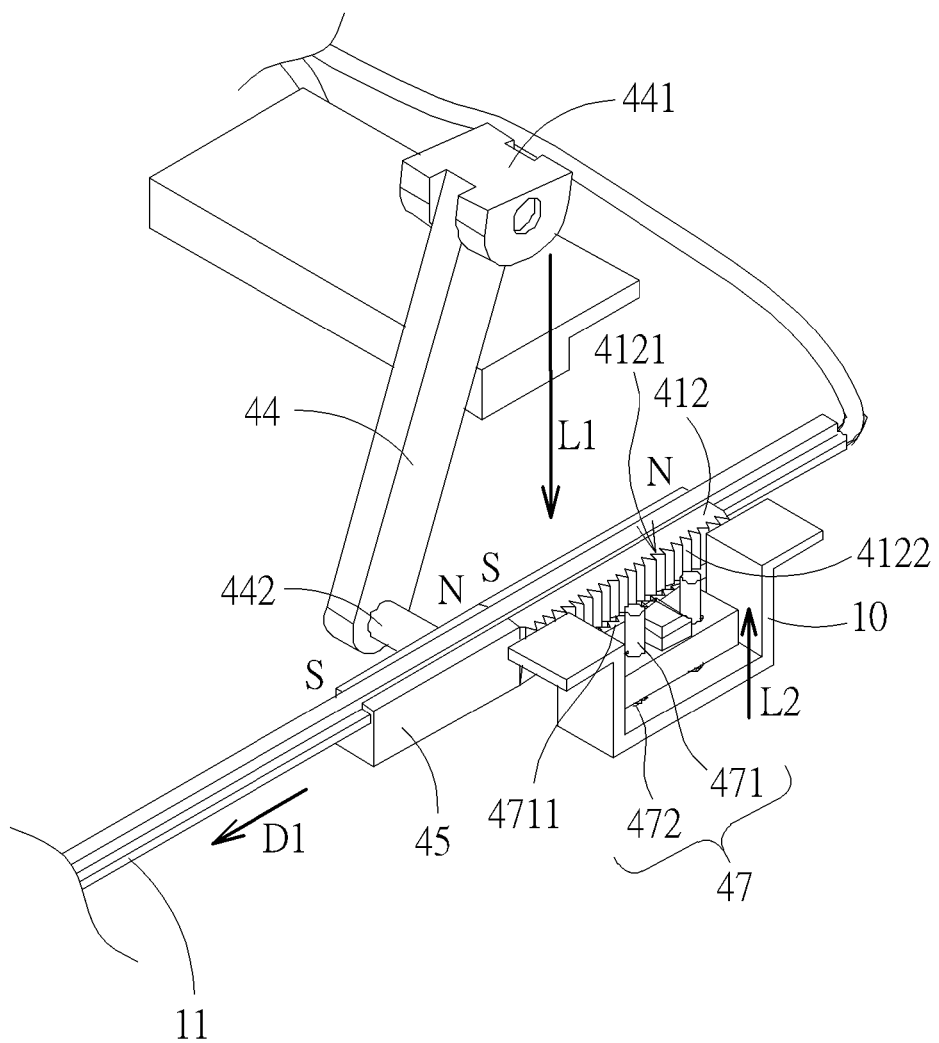
FIG. 9 is an illustration showing a status where the adjusting component no longer couples with the second electromagnet.

Specific operation is provided as followed. Please refer to FIG. 9 altogether. FIG. 9 is an illustration showing a status where the adjusting component no longer couples with the second electromagnet. When the electronic part is configured at the lifted position as shown in FIG. 8 and also in FIG. 2, the second electromagnet 412 is configured by the electromagnetic unit to the first magnetic configuration, causing attachment of the second electromagnet 412 and the second magnetic element 45. Under such status, pressing the first limit part 471 along direction L1 will decouple the rack structure 4711 of the first limit part 471 from the rack structure 4122 of the second limit part 4121, where the resilient restoring component 472 at this time is compressed and provides a restoring force for the first limit part 471 towards the engagement with the second limit part 4121, i.e., towards direction L2. As shown in FIG. 9 and FIG. 2, pressing the rear end 32 of the electronic part 30 along direction L1 also moves the support piece 44 downward and brings the second magnetic element 45 of the support piece 44 to slide along direction D1. Additionally, the attraction force between the second magnetic element 45 and the second electromagnet 412 also brings the second electromagnet 412 to slide toward direction D1. Hence, pressing the rear end 32 of the electronic part 30 changes the height of the electronic part 30 that is lifted.

Figure 10:
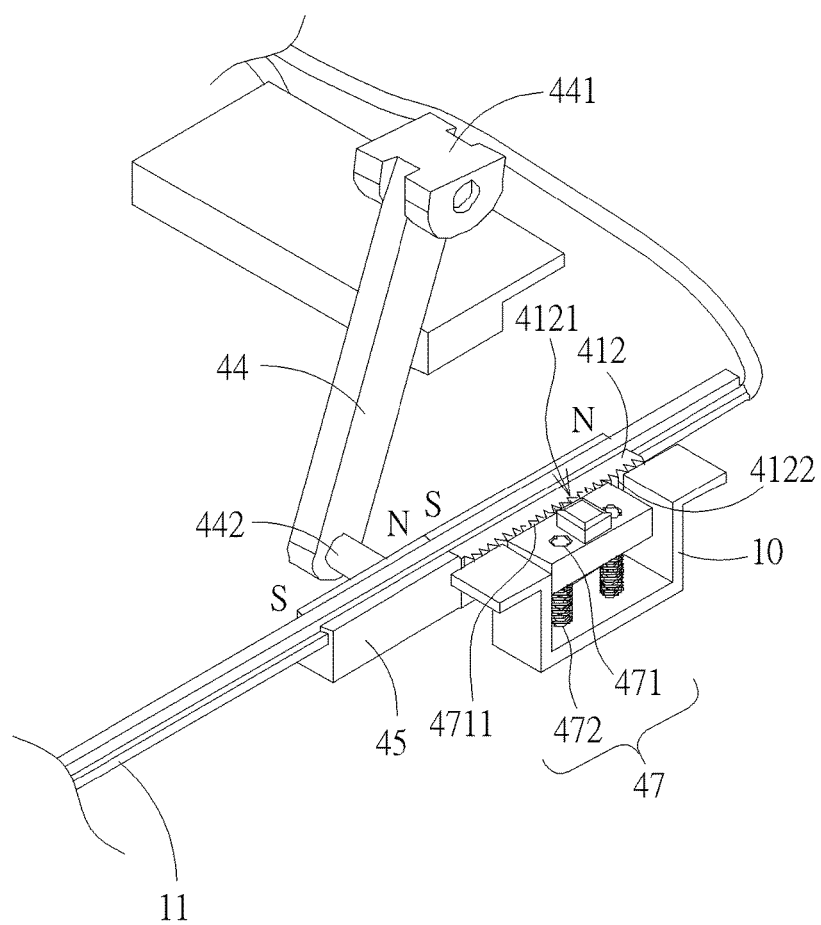
FIG. 10 is an illustration showing the elevating assembly retained at another lifted position.
Figure 11:
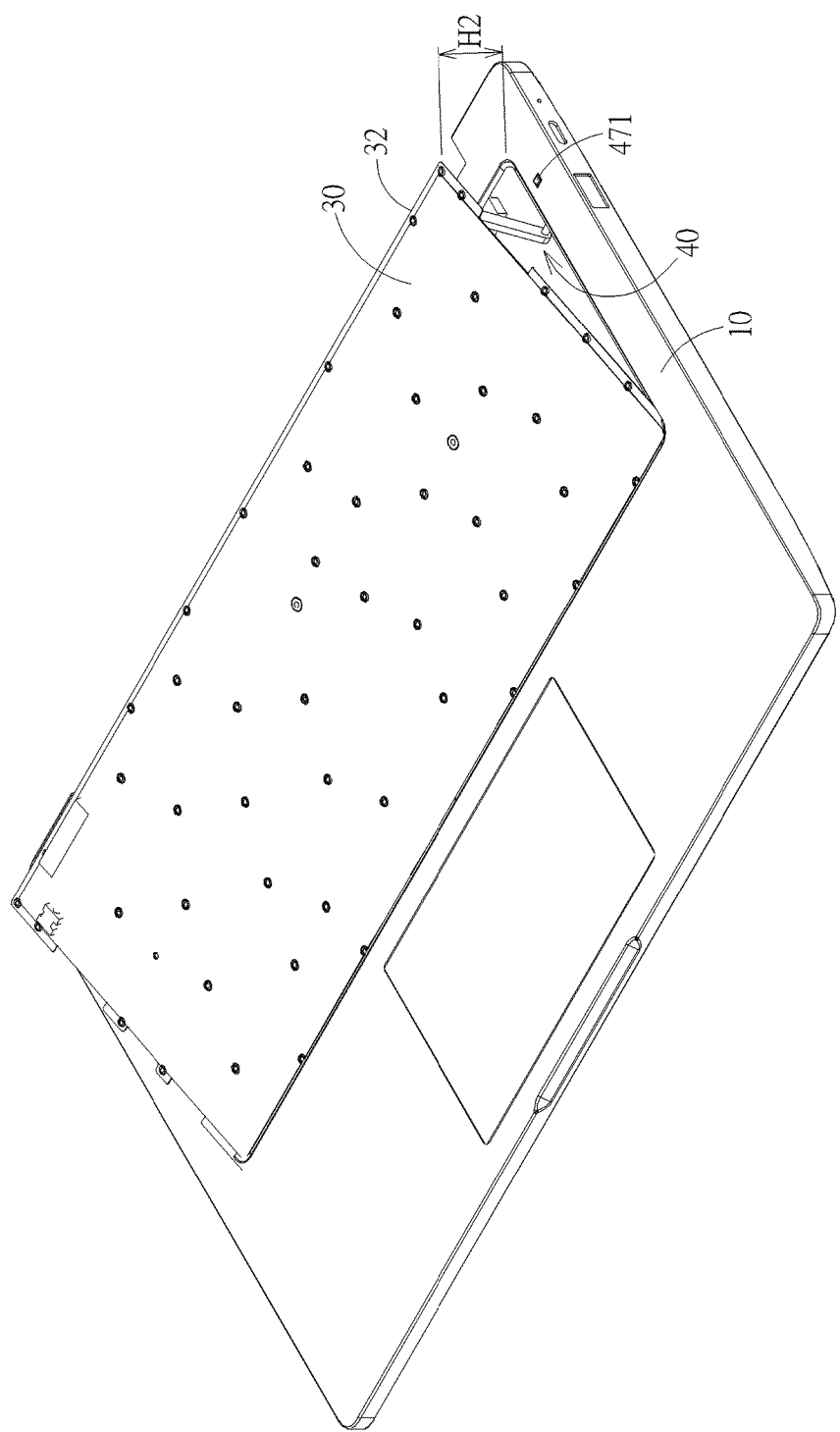
FIG. 11 is an illustration showing the electronic part being configured at what is corresponding to the lifted position in FIG. 10 after the adjustment of the height.

Please refer to FIG. 10 and FIG. 11. FIG. 10 is an illustration showing the elevating assembly retained at another lifted position and FIG. 11 is an illustration showing the electronic part being configured at what is corresponding to the lifted position in FIG. 10 after the adjustment of the height. Once the electronic part 30 is adjusted to the height as required, releasing the pressed first limit part 471 lets the resilient restoring component 472 to push back the first limit part 471 toward direction L1 as shown in FIG. 9 and once again the rack structure 4711 couples with the rack structure 4122 of the second limit part 4121 as shown in FIG. 10. Now the electronic part 30 is adjusted to another lifted position with another height like a second height H1 in FIG. 11, compared to a first height H1 in FIG. 2. In another embodiment of the invention, the adjusting component 47 may also be a knob with rack structure for coupling with the rack structure 4122 of the second limit part 4121. Rotating the knob therefore moves and changes the position of the second electromagnet 412. It can be understood by any person skilled in the art to accomplish the adjustment of the position of the second electromagnet 412 through other types of mechanism cooperation and the invention is not limited by the embodiments provided.

Figure 12:
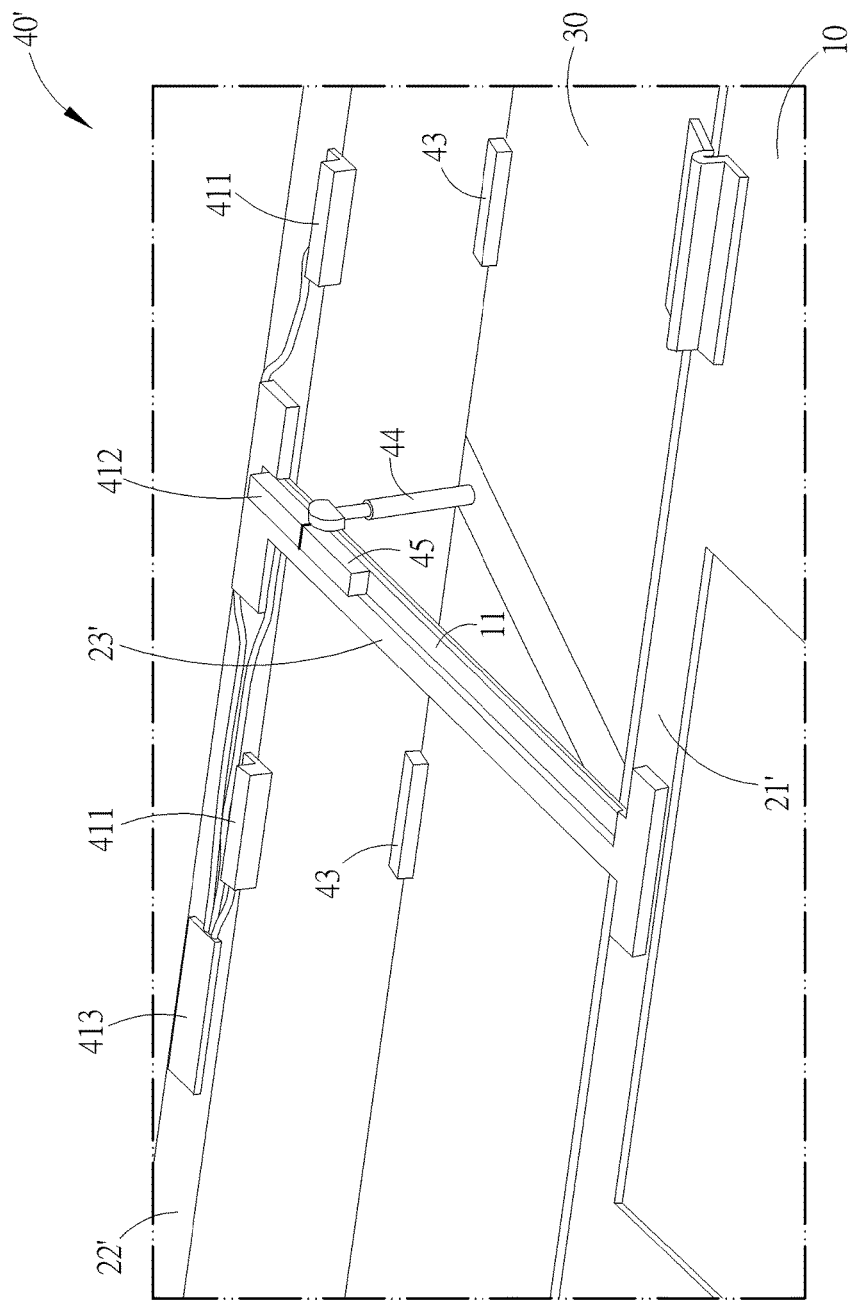
FIG. 12 is an illustration showing another configuration the elevating assembly in the electronic device according to the invention.

Please refer to FIG. 12, which is an illustration showing another configuration the elevating assembly in the electronic device according to the invention. The embodiment is FIG. 12 shows an upside down view of an electronic device. It should be noted that each component of the elevating assembly for the previous embodiments comes in pair at both sides of the electronic part 30 and the housing 10, except for the driving device 413. For the embodiment in FIG. 12, however, parts of an elevating assembly 40' is disposed at the middle bottom of the electronic part 30. In other words, a third side 23' of the opening respectively connects mid-sections of a first side 21' and a second side 22' (compared to former embodiments with the third side 23 connecting the ends of the first sides and the second side 22). The third side 23' also comes with the T-shape track 11 for the second magnetic element 45 to slide on, while the elevating assembly 40' comes with one second electromagnet 412 disposed at the third side 23'. Additionally, the elevating assembly 40' also has the first electromagnets 411 and the first magnetic elements 43 coming in pairs with similar way of working as those embodiments aforementioned. Detailed of such is omitted for brevity.

The embodiments of the invention provide that the lift structure, which is composed by electromagnets, magnetic components, and support piece, is disposed at the rear end of the electronic part and the housing of the electronic device. The magnetic components can be permanent magnets and disposed at the rear end of the electronic part and the support piece. The electromagnets are controlled by driving device to a configuration so as to have repulsion and attraction to the rear end and to the support piece respectively, thereby configuring the rear end to a lifted position, or to another configuration so as to have attraction and repulsion to the rear end and to the support piece respectively, thereby configuring the rear end to a retracted position. The adjusting component is further disposed at the side to adjust the position of the electromagnet to determine the height of the rear end of the electronic part when set in the lifted position. By using electromagnetic control and the adjusting component, the rear end of the electronic part can automatically lift through one touch press or retract backward for giving back the space taken when lifted. User experience is therefore improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having automatic elevating assembly, comprising:
   a housing having an opening;
   an electronic part disposed in the opening with a front end of the electronic part pivoting to a first side of the opening; and
   an elevating assembly, a rear end of the electronic part opposite to the front end selectively configurable to a lifted position or a retracted position via the elevating assembly, the elevating assembly comprising:
      an electromagnetic unit comprising a first component and a second component respectively disposed at a second side, which is opposite to the first side, and a third side of the opening, the electromagnetic unit selectively configurable at a first magnetic configuration or a second magnetic configuration;
      a first magnetic element disposed at the rear end of the electronic part and facing the first component of the electromagnetic unit; and
      a support piece comprising a first end and a second end, the first end pivoted to the electronic part, the second end comprising a second magnetic element slidably disposed at the third side of the opening and facing the second component of the electromagnetic unit;
   wherein when the electromagnetic unit is configured at the first magnetic configuration, the first component of the electromagnetic unit and the first magnetic element are having same polarity and are repulsed away with each other, and the second component of the electromagnetic unit and the second magnetic element are having opposite polarities and are attracted to each other such that the rear end of the electronic part is configured to the lifted position;
   wherein when the electromagnetic unit is configured at the second magnetic configuration, the first component of the electromagnetic unit and the first magnetic element are having opposite polarities and are attracted to each other, and the second component of the electromagnetic unit and the second magnetic element are having same polarity and are repulsed away with each other such that the rear end of the electronic part is configured to the retracted position.

2. The electronic device of claim 1, wherein the first component of the electromagnetic unit is a first electromagnet and the second component of the electromagnetic unit is a second electromagnet, the first electromagnet disposed at the second side of the opening and facing the first magnetic element and the second electromagnet disposed at the third side of the opening and facing the second magnetic element.

3. The electronic device of claim 2, wherein the electromagnetic unit further comprises a driving device electrically connected to the first electromagnet and the second electromagnet for selectively configuring the first electromagnet and the second electromagnet at the first magnetic configuration or the second magnetic configuration.

4. The electronic device of claim 2, wherein the elevating assembly further comprises an adjusting component disposed at the third side for selectively adjusting position, along the third side, of the second electromagnet at the third side.

5. The electronic device of claim 4, wherein the adjusting component comprises a first limit part and a second limit part, the second limit part incorporated with the second electromagnet, the first limit part and the second limit part coupled with each other for fixing the second electromagnet at the third side.

6. The electronic device of claim 5, wherein the adjusting component further comprises a resilient restoring component exerted upon the first limit part; when the first limit part is exerted with a force and decouple from the second limit part, the second electromagnet is allowed to slide along the third side and the resilient restoring component provides a restoring force for the first limit part towards the engagement with the second limit part.

7. The electronic device of claim 6, wherein the first limit part and the second limit part respectively comprise rack structures or gear structures engaged with each other.

8. The electronic device of claim 1, wherein the third side of the opening respectively connects ends of the first side and the second side, a slide structure disposed between the third side and the second end of the support piece for allowing the second end to slide along the third side.

9. The electronic device of claim 8, wherein the slide structure comprises a T-shape track and the second magnetic element is slidably disposed on the T-shape track.

10. The electronic device of claim 1, wherein the third side of the opening respectively connects mid-sections of the first side and the second side, a slide structure disposed between the third side and the second end of the support piece for allowing the second end to slide along the third side.

11. The electronic device of claim 10, wherein the slide structure comprises a T-shape track and the second magnetic element is slidably disposed on the T-shape track.

12. The electronic device of claim 1, wherein the front end of the electronic part is pivoted to the first side via a pivoting element, wherein the pivoting element is a damping hinge.

13. The electronic device of claim 1, wherein the first magnetic element and the second magnetic element are permanent magnets.

14. The electronic device of claim 1, wherein the electronic device is a laptop computer and the electronic part is a keyboard.

15. The electronic device of claim 1, wherein the electronic device is a flat panel display and the electronic part is a touch display panel of the flat panel display.

\* \* \* \* \*